(12) United States Patent
Madge et al.

(10) Patent No.: US 6,560,890 B1
(45) Date of Patent: May 13, 2003

(54) FIXTURE FOR LOCATING AND CLAMPING A PART FOR LASER DRILLING

(75) Inventors: James Henry Madge, Cincinnati, OH (US); Brett Wayne Byrnes, Albuquerque, NM (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/080,169

(22) Filed: Feb. 21, 2002

(51) Int. Cl.[7] .................................................. G01B 5/24
(52) U.S. Cl. .............................. 33/549; 33/645; 269/909
(58) Field of Search .......................... 33/549, 613, 645; 269/56, 58, 909

(56) References Cited

U.S. PATENT DOCUMENTS

| | | |
|---|---|---|
| 4,032,743 A | 6/1977 | Erbach et al. |
| 4,298,784 A | 11/1981 | Schmall |
| 4,322,887 A | 4/1982 | Burton |
| 4,374,459 A | 2/1983 | Burton |
| 4,431,899 A | 2/1984 | Racki et al. |
| 4,465,919 A | 8/1984 | Roder |
| 4,485,453 A * | 11/1984 | Taylor ........................ 33/613 |
| 4,694,139 A | 9/1987 | Roder |
| 4,794,222 A | 12/1988 | Funayama et al. |
| 4,825,032 A | 4/1989 | Duncan |
| 5,083,006 A | 1/1992 | Stroud |
| 5,174,715 A | 12/1992 | Martin |
| 5,182,855 A | 2/1993 | Martin |
| 5,231,471 A | 7/1993 | Torigoe |
| 5,544,873 A | 8/1996 | Vickers et al. |
| 5,719,373 A | 2/1998 | Snyder et al. |
| 6,114,653 A | 9/2000 | Gustafson |
| 6,130,405 A | 10/2000 | Loringer |
| 6,463,979 B1 * | 10/2002 | Sano et al. ................... 269/58 |

* cited by examiner

Primary Examiner—G. Bradley Bennett
(74) Attorney, Agent, or Firm—VG Ramaevemy; McNees, Wallace & Nurick (57) ABSTRACT

A fixture is provided for holding a part for a machining operation. The fixture includes a base assembly and a locator assembly. The part is placed in the base assembly and held by floating supports and spring clamps that permit a small amount of adjustment of the part in the base assembly. The locator assembly is then moved into its engaged position with the base assembly to fix the part into its machining position by adjusting the part relative to the floating supports and spring clamps. A mechanism on the base assembly is then used to fix the floating supports to hold the part in the machining position. Finally, the locator assembly is rotated into the disengaged position and the part can be machined as necessary.

22 Claims, 9 Drawing Sheets

FIXTURE FOR LOCATING AND CLAMPING A PART FOR LASER DRILLING

BACKGROUND OF THE INVENTION

The present invention relates generally to a part fixture for a laser drilling operation. More specifically, the present invention is directed to a fixture for turbine nozzles that does not interfere with a laser drilling operation on the turbine nozzle.

In general manufacturing of turbine nozzles and other parts, the fixtures used for manufacturing the parts have fixed locators to position the part in the proper orientation for machining. The fixed locators are usually positioned against the part's datums. The datums of the part are preset locations or points on the part that, when support is applied to those locations, prevent the part from translating along the three axes of a three axis orthogonal coordinate system (e.g. x, y, and z axes) and prevent the part from rotating about each of the three axes. Generally, a three-dimensional object will require 6 datum points. Using the datums of a part positions the part into a known position, which can then be used for a subsequent machining operation or for an assembly operation.

Figure 1:
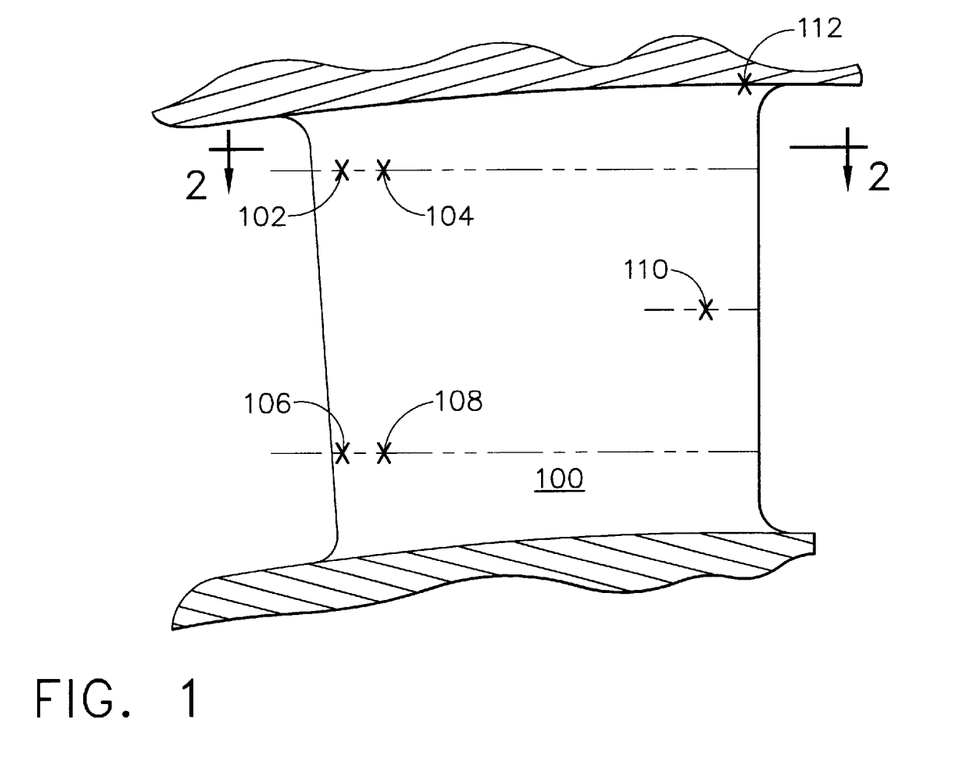
FIG. 1 illustrates a vane of a turbine nozzle and its corresponding datum points.
Figure 2:
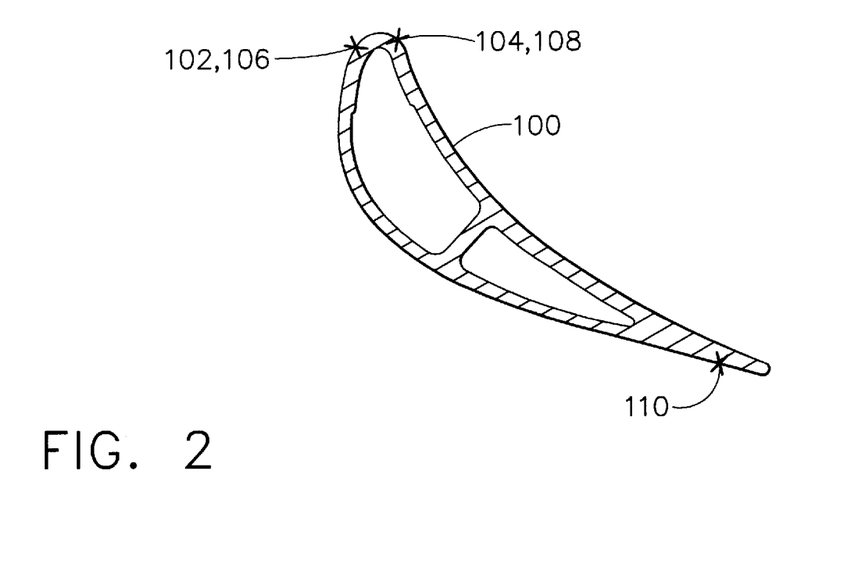
FIG. 2 illustrates a cross-sectional view of the vane, with corresponding datum points, along line II—II of FIG. 1.

Generally, the vanes of a turbine nozzle have 4 of their 6 datum points located on the leading edge of the vane. FIGS. 1 and 2 illustrate a vane 100 of a turbine nozzle and the corresponding datum points 102–112 for the vane 100. As can be seen from FIGS. 1 and 2, datum points 102–108 are located on the leading edge of the vane 100. During the manufacturing of a vane for a turbine nozzle, it is necessary to laser drill cooling holes into the leading edge of the vane. To be able to laser drill cooling holes into the leading edge of a vane, the vane is generally positioned into a fixture and clamped at its datum points, as discussed above. However, the clamping of the part at its datum points by the fixture can interfere with the laser drilling operation, if holes are to be laser drilled at or in the vicinity of the datum points.

Figure 3:
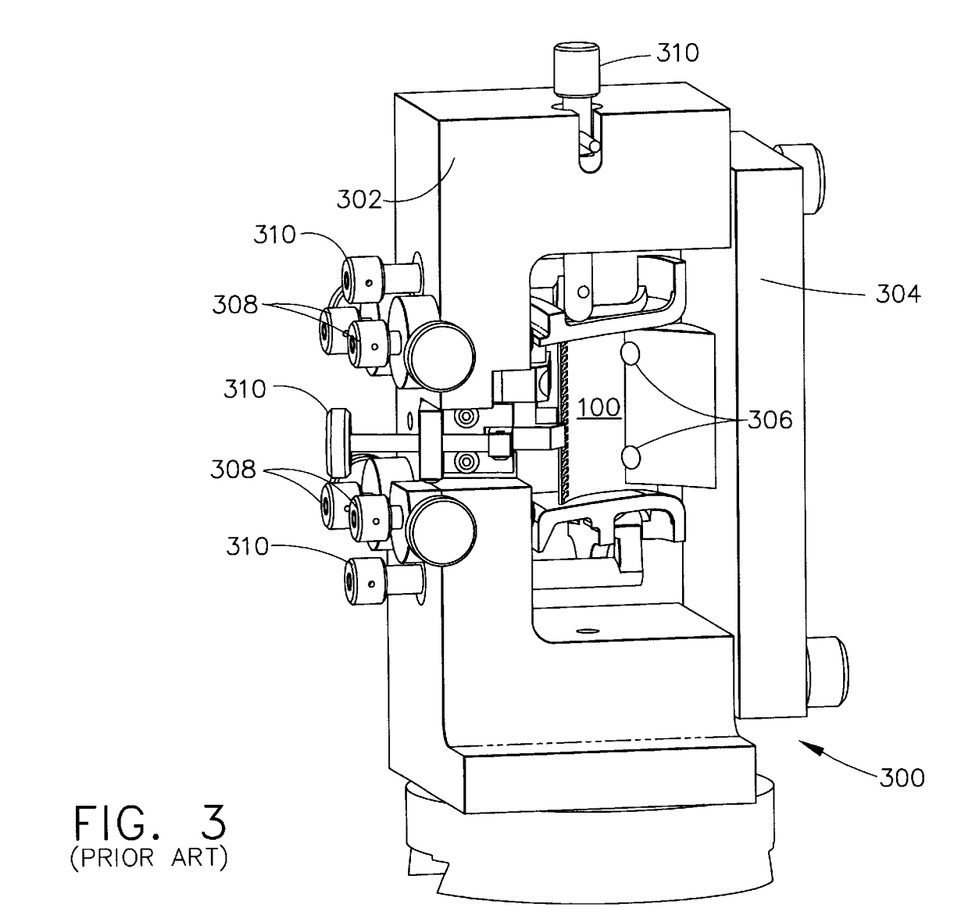
FIG. 3 illustrates a side view of a prior art fixture.
Figure 4:
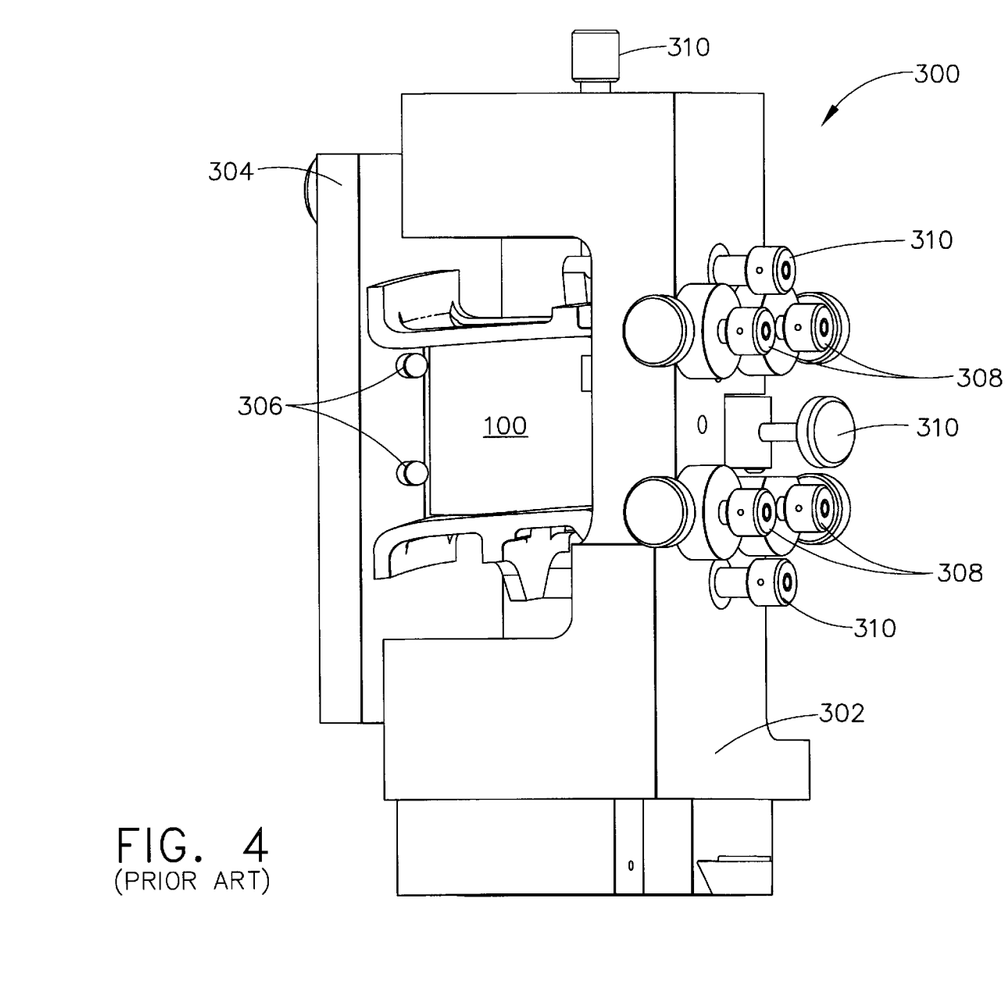
FIG. 4 illustrates the opposite side of the prior art fixture of FIG. 3.

FIGS. 3 and 4 illustrate a prior art fixture 300 used for laser drilling holes in a vane 100. The vane 100 is placed into a base 302 and a plate 304 is attached to the base 302 to hold the vane 100 in the fixture 300. The plate 304 has 4 fixed datum locators 306 that are used in positioning the vane 100 and locating the leading edge of the vane 100. The fixture 300 utilizes several screws 308 to hold the part or vane 100 against the leading edge locators 306. These screws 308 are a form of an adjustable work support. Once the part 100 is secured against the locators 306, screw clamps 310 are used to hold the part 100 against the screws or work supports 308 of the fixture 300. The clamps 310 are used to ensure that there is not any translation or rotation of the part 100. An iterative process of adjusting the work supports 308 and the clamps 310 is used to ensure that the vane 100 is seated against the locators 306. Once the part 100 is properly located and clamped, the plate 304 containing the leading edge locators 306 is removed permitting laser access to the leading edge of the vane 100. This process of iterative adjustment of the screws 308 and clamps 310 to position the vane 100 is time consuming, prone to part miss-load and ergonomically unfriendly.

Therefore what is needed is a fixture where parts can be easily and accurately loaded into an appropriate position for laser drilling and then held in the appropriate position without interfering with the laser drilling operation.

SUMMARY OF THE INVENTION

One embodiment of the present invention is directed to a fixture to align and hold a part for a machining operation. The fixture includes a base assembly and a locator assembly. The base assembly is configured to hold a part for a machining operation. The locator assembly has a first end pivotably connected to the base assembly and a second end opposite the first end. The second end of the locator assembly is pivotable between an engaged position adjacent the base assembly and a disengaged position opposite the base assembly. The locator assembly includes at least one part locator to align a part for a machining operation. The locator assembly is configured to position a part held in the base assembly against the at least one part locator to align a part in the base assembly for a machining operation in response to the second end of the locator assembly being in the engaged position.

Another embodiment of the present invention is directed to a fixture to align and hold a vane for a laser drilling operation. The fixture includes means for holding a vane for a laser drilling operation and a locator arm. The locator arm is connected to the means for holding a vane at one end and is detachably connected to the means for holding a vane at the other end. The locator arm is pivotable about the end connected to the means for holding a vane to move the other end to detachably connect to the means for holding a vane. The fixture also includes at least one locator. The at least one locator is disposed on one of the means for holding a vane and the locator arm. Finally, the means for holding a vane and the locator arm are configured to position a vane against the at least one locator in response to the second end of the locator arm being connected to the means for holding a vane such that a vane is in a predetermined alignment position for a laser drilling operation.

One advantage of the present invention is that it is easier for an operator to load a part into the fixture.

Another advantage of the present invention is that parts can be accurately loaded into the fixture in less time and with less effort.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Whenever possible, the same reference numbers will be used throughout the figures to refer to the same parts.

DETAILED DESCRIPTION OF THE INVENTION

The present invention is directed to a fixture for holding a part or workpiece for a machining operation. In a preferred embodiment of the present invention, the part that is being worked on is a vane of a turbine nozzle and the machining operation is a laser drilling operation. The laser drilling operation is performed on the leading edge of the vane and often occurs at or near the datums on the leading edge of the vane. While the fixture of the present invention is described in the context of positioning and holding a vane for laser drilling, it is to be understood that the fixture of the present invention can be used for securing other types of parts and workpieces for similar or different types of machining operations.

Figure 5:
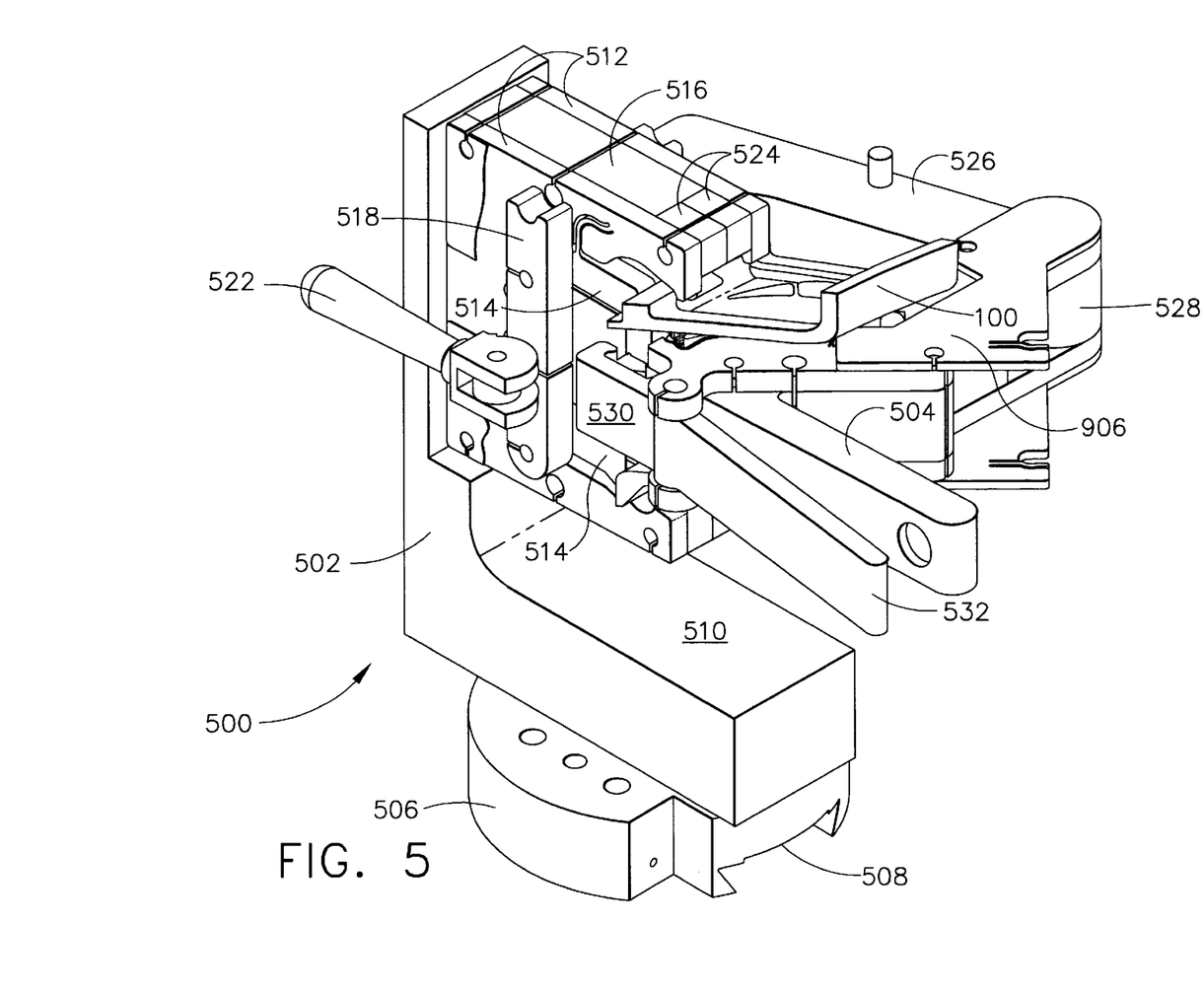
FIG. 5 illustrates the fixture of the present invention with the locator assembly in an engaged position.

FIG. 5 illustrates a preferred embodiment of the fixture 500 of the present invention. The fixture 500 is used to hold a part 100, which is preferably a vane of a turbine nozzle, and includes a base assembly 502 and a locator assembly 504. The base assembly 502 is the fixed part of the fixture 500 and includes a connecting arrangement 506 for attaching or connecting the fixture 500 to a laser turntable (not shown). The connecting arrangement 506 can utilize any suitable technique for connecting the fixture 500 to the laser turntable. For example, as shown in FIG. 5, the connecting arrangement 506 can include a shaped channel 508 or dovetail slot that mates with a projection or dovetail on the laser turntable similar to a spline connection. However, the connecting arrangement 506 could be a screw connection, a bolted connection or use locator pins with mating apertures.

Rigidly attached or connected to the connecting arrangement 506 is a support member 510. The support member 510 is preferably "L"-shaped having a horizontal portion and a vertical portion, but other shapes can be used. The horizontal portion of the support member 510 is attached to the connecting arrangement 506 through welding, bolting or any other suitable technique. Attached to the vertical portion of the support member 510 are two substantially parallel support plates 512 that extend from the vertical portion of the support member 510, preferably over the horizontal portion of the support member 510. Each support plate 512 has one or more floating supports 514 that are in contact with portions of the part 100. The floating supports 514 are designed to behave like a spring and have a flexible connection to the support plate 512 such that the floating supports 514 can shift position based on the amount of pressure applied by the part 100. A more detailed explanation of the floating supports is provided below with respect to FIG. 7.

Figure 10:
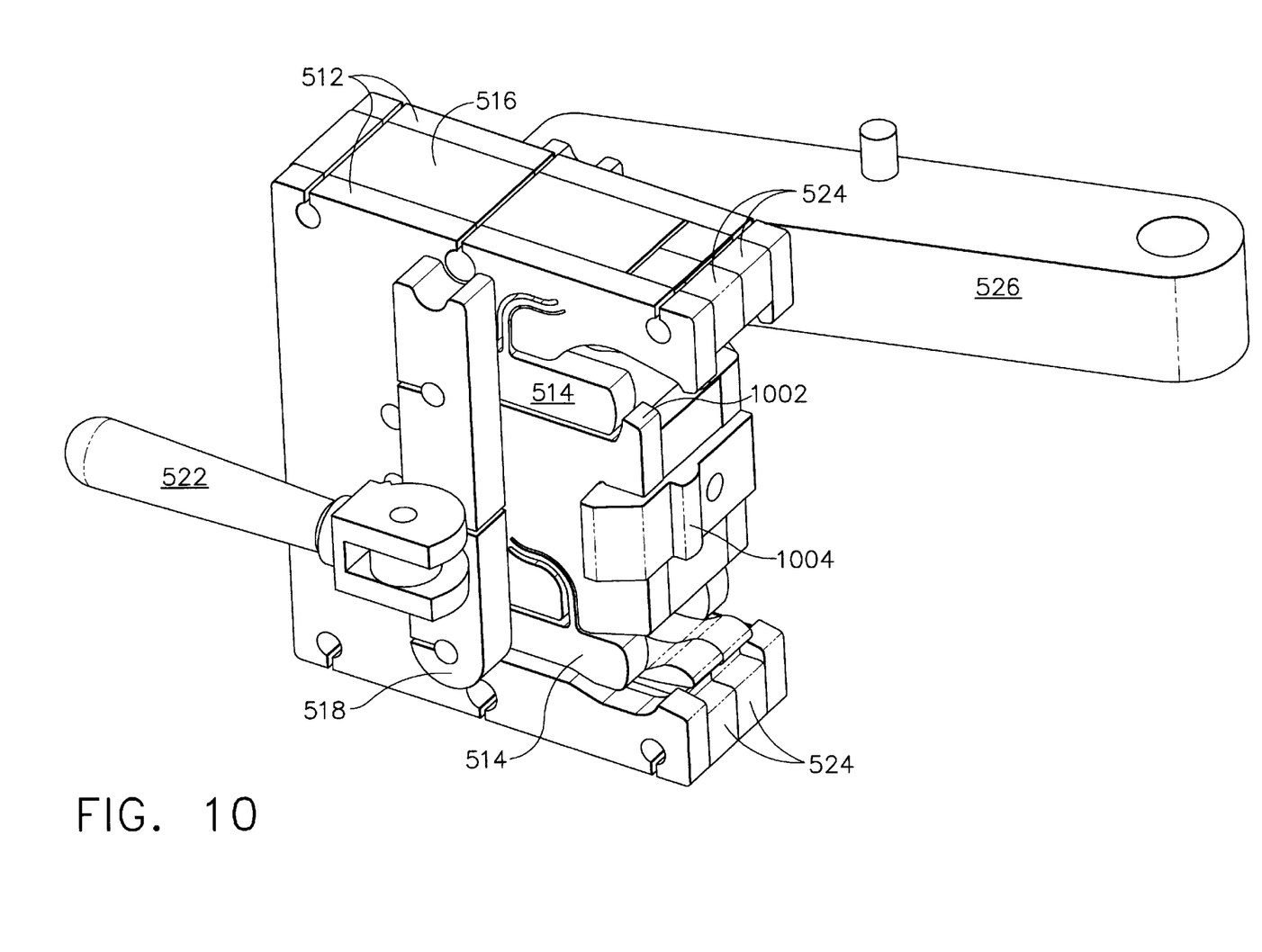
FIG. 10 illustrates a partial three-quarter side view of the base assembly.

A spacer 516 is positioned between the two support plates 512. The spacer 516 is sized to contact the facing surfaces of the support plates 512. The base assembly 502 further includes a first pair of clamps or clamping members 518. The clamps 518 are positioned in contact with a support plate 512 and opposite the spacer 516. The clamps 518 are linked together by a rod 520 (see FIG. 8) and operated by a lever 522 connected to the rod 520. When the lever 522 is operated, the clamps or clamping members 518 are forced together against the spacer 516 to hold the floating supports 514 in their appropriate position. More detail on the operation of the lever 520 is provided below. Attached to the spacer 516 and the support plates 512 are one or more second clamps 524. The clamps 524 are used to hold and secure the part 100 in the base assembly 502. Clamps 524 are preferably spring clamps, however, other types of clamps may be used. More detail on the operation of the clamps 524 is provided below with respect to FIG. 7. The base assembly 502 also includes two of the locators for the part 100. As shown in FIG. 10, part locator 1002 is preferably used to position the part 100 to the proper height in the fixture 500. Part locator 1004 is preferably used to position the part 100 to the proper depth in the fixture 500.

Finally, the base assembly 502 includes an arm 526 with a hinge point 528. The locator assembly 504 is connected to the arm 526, and the base assembly 502, at the hinge point 528. The locator assembly 504 can pivot about the hinge point 528 between an engaged position and a disengaged position. In a preferred embodiment of the present invention, the locator assembly 504 is connected to the hinge point 528 with a pin that passes through the hinge point 528. The locator assembly 504 is in the engaged position with the base assembly 502 as shown in FIG. 5 and positions the part 100 against the six datum locators. The engagement of the locator assembly 504 and the base assembly 502 is maintained with a locking mechanism 530. The locator assembly 504 has four leading edge locators 902 (see FIG. 9) for the part 100. The engagement of the locator assembly 504 with the base assembly 502 positions the part 100 against those four leading edge locators. More details on how the locator assembly 504 positions the part 100 will be provided below.

Figure 6:
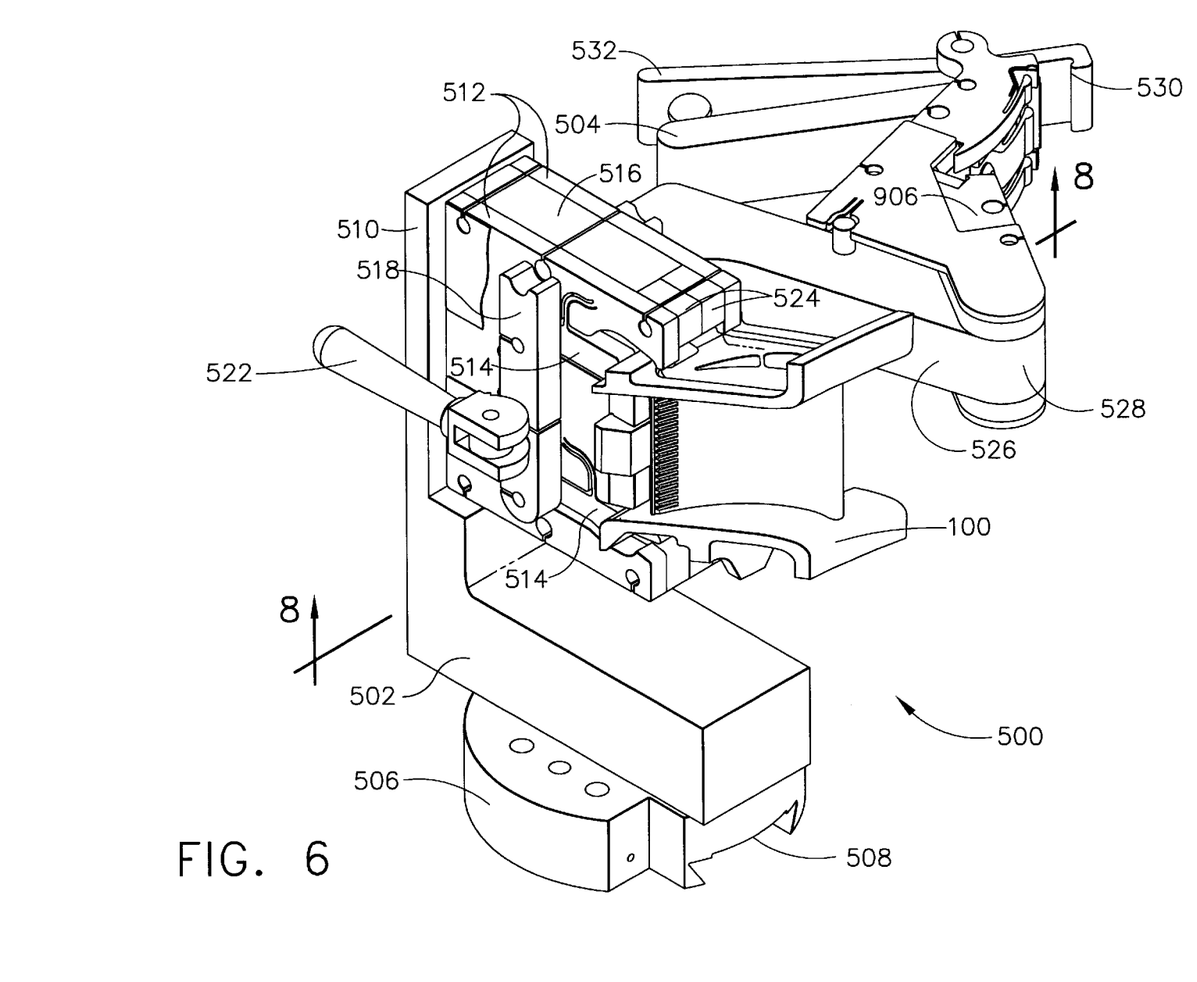
FIG. 6 illustrates the fixture of the present invention with the locator assembly in a disengaged position.

After the part 100 has been locked into position in the base assembly 502 by clamping the floating supports 514 with the clamps 518 using the lever 522, the locking mechanism 530 can be released using a release mechanism 532 and the locator arm 504 pivoted into the disengaged position. FIG. 6 illustrates the part 100 being held in the base assembly 502 and the locator arm 504 in the disengaged position. Once the part 100 is in the position shown in FIG. 6, the laser drilling operation can commence. On conclusion of the laser drilling operation, the lever 522 can be used to release clamps 518 and permit the part 100 to be removed from the base assembly 502. The fixture 500 is then ready to receive the next vane that requires a laser drilling operation.

Figure 7:
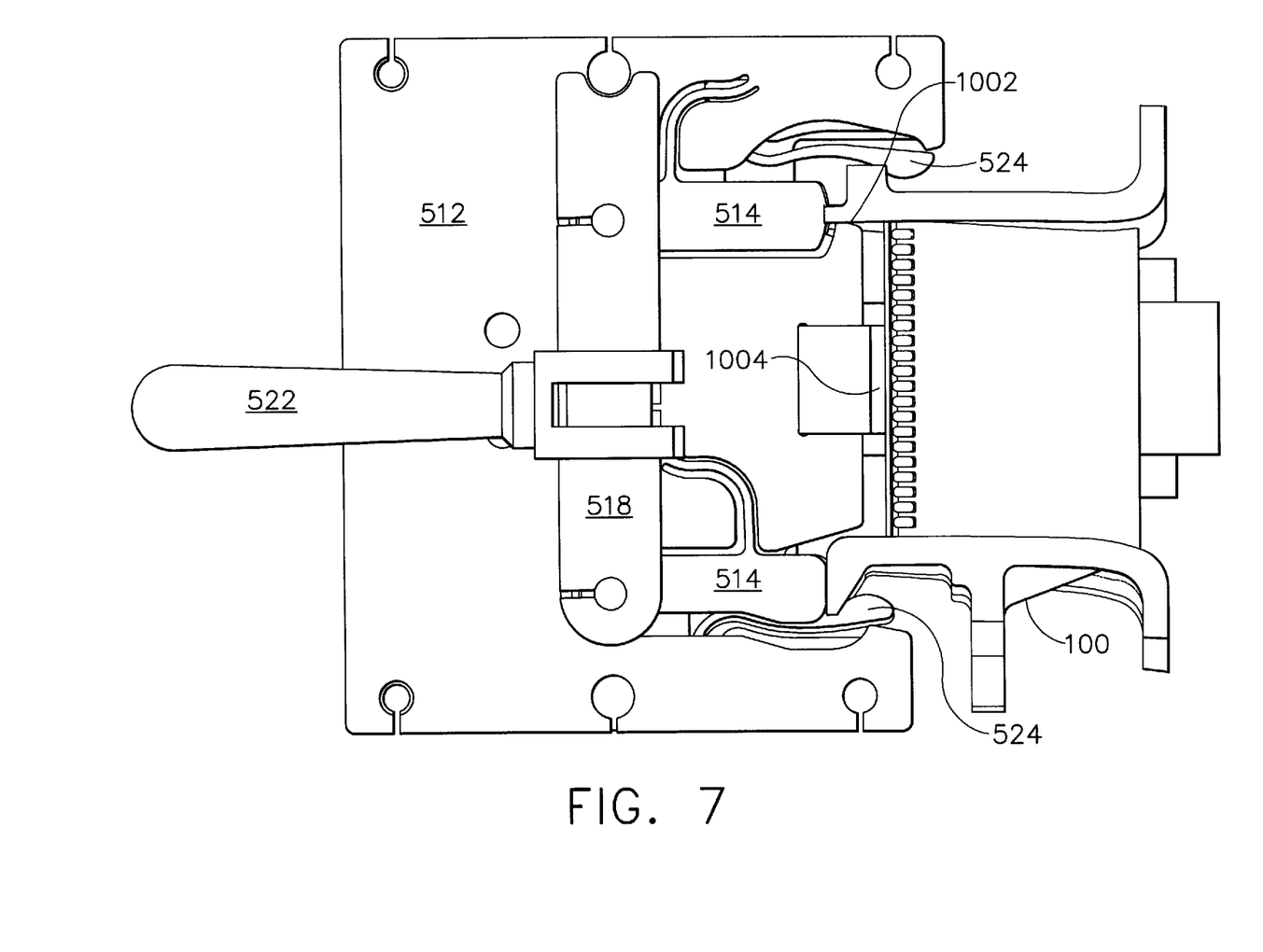
FIG. 7 illustrates a partial side view of the base assembly of the fixture of the present invention.

FIG. 7 illustrates a part 100 being held in position by clamps 524 and by floating supports 514 that have been fixed in position by the lever 522. To reach this position in FIG. 7, the part 100 is first manually pressed into the base assembly 502, with the lever 522 in the unlocked position. At this point, the four floating supports 514 are in contact with the part 100 at four locations on the part 100 and held in contact with the part by clamps 524. The clamps 524 provide tensioning on the part 100 in opposite directions to hold the part in place and in contact with the floating supports 514. The floating supports 514 are preferably designed to have interference with the nominal shape of the part 100. This interference provides a spring force against the part 100 and will accommodate variations in the part 100 dimensions.

Next, the locator arm 504 is rotated into the engaged position and locked, thereby positioning the leading edge locators 902 in the locator arm 504 against the part 100. The floating supports 514 have sufficient spring force from the interference between the part 100 and the floating supports 514 to position the part 100 against the leading edge locators 902. Once the part 100 is positioned against the leading edge locators 902 by the floating supports 514, the lever 522 is moved from its unlocked position to its locked position, thereby fixing or locking the floating supports 514 in their position. Clamps 524 are used to maintain the part 100 against the fixed floating supports 514 to ensure that the part 100 remains in this fixed position for machining. The locator arm 504 can then be rotated away from the part 100 and stowed in the disengaged position to not interfere with laser access to the leading edge of the part 100.

Figure 8:
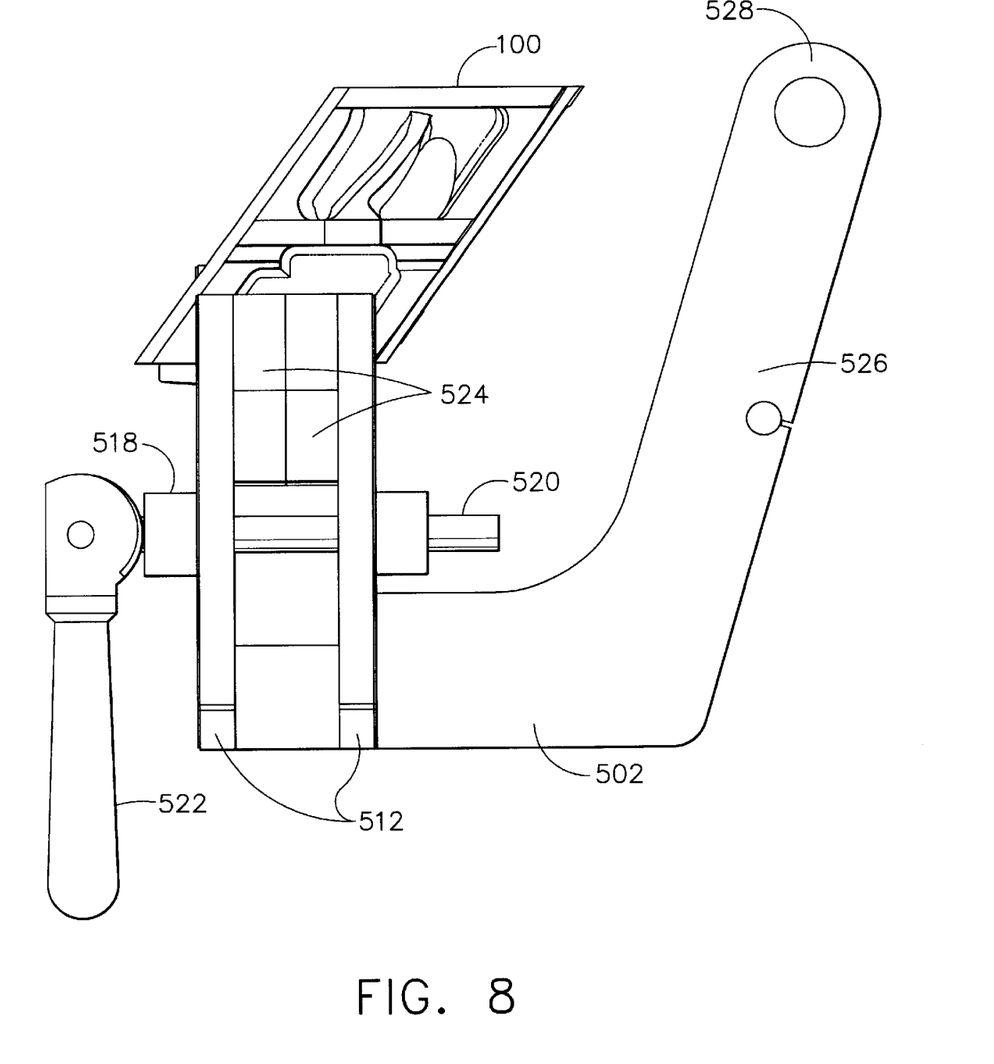
FIG. 8 illustrates a bottom view of the base assembly along line VIII—VIII of FIG. 6.

FIG. 8 illustrates the operation of the clamps 518 to hold the floating members 514 (not shown in FIG. 8). The spacer 516 has been omitted from FIG. 8 to provide additional detail on the operation of the clamps 518. After the part 100 has been positioned against the leading edge locators 902, the lever 524 can be moved from its unlocked position to its locked position by changing the position of a cam on the lever 522 in contact with one of the clamps 518. When the lever 522 is moved into the locked position, the clamp 518 positioned farthest from the lever 522 is drawn toward the lever 522 and the other clamp 518 by rod 520. The drawing or pulling together of the clamps 518 toward one another by the lever 522, presses or clamps the floating supports 514 against the spacer 516, holding the floating supports 514 in place by reducing the flexibility and range of motion of the floating supports with the clamping action. The lever 522 and clamps 518 are the preferred mechanism for fixing and holding the floating supports 514, but any mechanism that can hold and fix the floating supports 514 in the appropriate position to hold the part 100 for a machining operation can be used.

Figure 9:
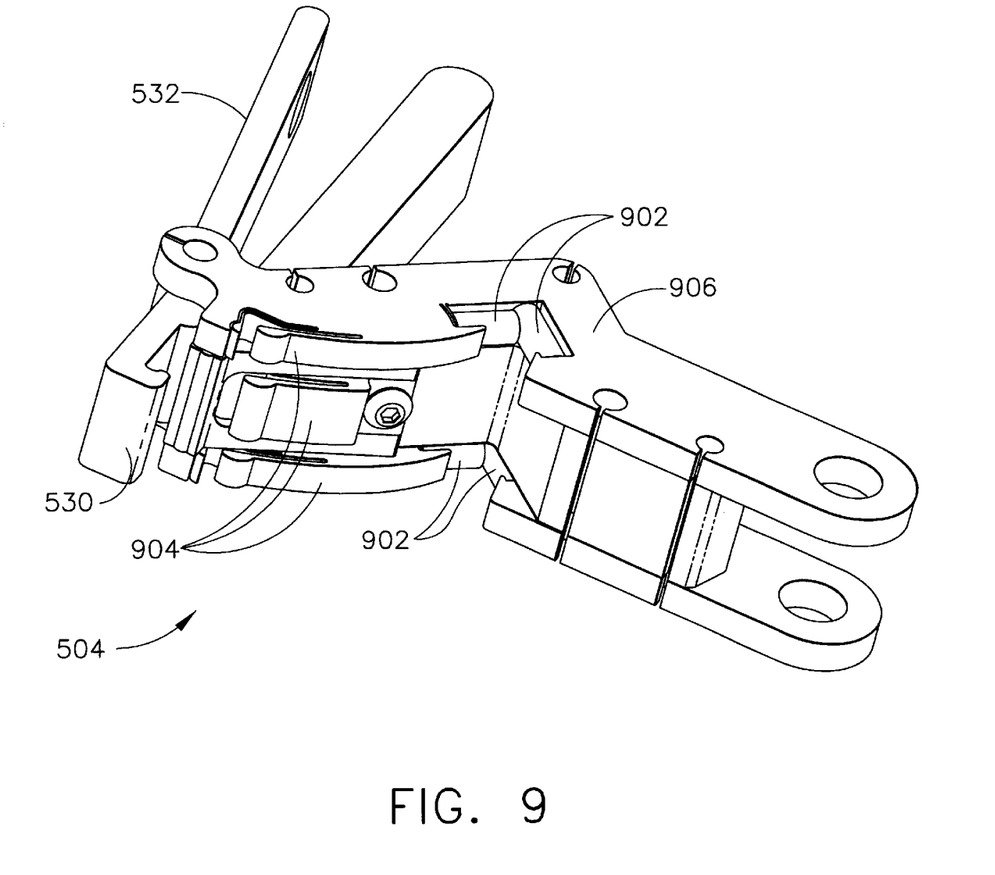
FIG. 9 illustrates the locator assembly of the fixture of the present invention.

FIG. 9 illustrates the locator arm 504 in more detail. The locator arm 504 has four leading edge locators 902 and one or more springs 904 to position or seat the part 100 into the proper position in the base assembly 502. The leading edge locators 902 are preferably dowel pins positioned in a hinge device 906 that locates and presses the part 100 into the proper position. The hinge device 906 can be preferably designed to closely fit around or receive the part 100 by having an opening that has the approximate the shape of the part 100, such that when the locator arm 502 is pivoted into the engaged position, the leading edge locators 902 in the hinge device 906 are placed in contact with the leading edge of the part or vane 100. The springs 904, which may be leaf springs, are also placed in contact with the vane 100 and are used to account for minor variations in the dimensions of the vane 100. The springs 904 push or urge the vane 100 against locator 1004 and by pushing on the trailing edge of the vane 100 assist in urging the vane 100 into the proper position against the six locators of the fixture 500.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A fixture to align and hold a part for a machining operation, the fixture comprising:
   a base assembly, the base assembly being configured to hold a part for a machining operation;
   a locator assembly, the locator assembly comprising a first end pivotably connected to the base assembly and a second end opposite the first end, the second end of the locator assembly being pivotable between an engaged position adjacent the base assembly and a disengaged position opposite the base assembly, the locator assembly comprising at least one part locator to align a part for a machining operation; and
   wherein the locator assembly being configured to position a part held in the base assembly against the at least one part locator to align a part in the base assembly for a machining operation in response to the second end of the locator assembly being in the engaged position.

2. The fixture of claim 1 wherein:
   the at least one part locator comprises a plurality of part locators; and
   the locator assembly is configured to position a part held in the base assembly against the plurality of part locators so as to align a part in the base assembly for a machining operation in response to the second end of the locator assembly being in the engaged position.

3. The fixture of claim 2 wherein the plurality of part locators comprises four part locators.

4. The fixture of claim 3 wherein the locator assembly comprises a hinge device, the four part locators being disposed in the hinge device, and each part locator comprises a dowel pin.

5. The fixture of claim 1 wherein the locator assembly comprises at least one spring to urge a part held in the base assembly against the at least one part locator.

6. The fixture of claim 1 wherein the locator assembly comprises means for detachably connecting the second end of the locator assembly to the base assembly.

7. The fixture of claim 1 wherein:
   the base assembly further comprises at least one additional part locator to align a part for a machining operation; and
   the locator assembly is configured to position a part held in the base assembly against the at least one additional part locator to align a part in the base assembly in preparation for a machining operation in response to the second end of the locator assembly being in the engaged position.

8. The fixture of claim 7 wherein the at least one additional part locator further comprises two additional part locators.

9. The fixture of claim 1 wherein the base assembly further comprises:
   means for holding a part, the means for holding a part permitting alignment of a part in response to the second end of the locator assembly being in the engaged position; and
   means for fixing an alignment of a part held in the means for holding a part.

10. The fixture of claim 9 wherein the means for holding a part further comprises at least one clamp to hold a part for a machining operation.

11. The fixture of claim 10 wherein the means for holding a part further comprises at least one support to position a part held by the at least one clamp against the at least one part locator to align a part for a machining operation.

12. The fixture of claim 11 wherein the means for fixing an alignment of a part further comprises means for clamping the at least one support to fix a position and alignment of a part held in the at least one clamp, thereby maintaining a fixed position for a part when the second end of the locator assembly is pivoted into the disengaged position.

13. The fixture of claim 12 wherein:
   the means for clamping the at least one support further comprises at least one second clamp and a mechanism to open and close the at least one second clamp;
   the at least one support being disposed between clamping members of the at least one second clamp; and
   the at least one support being prevented from positioning a part in response to the at least one second clamp being closed.

14. A fixture to align and hold a vane for a laser drilling operation, the fixture comprising:
   means for holding a vane for a laser drilling operation;
   a locator arm, the locator arm being connected to the means for holding a vane at a first end and being detachably connected to the means for holding a vane at a second end opposite the first end, the locator arm being pivotable about the first end connected to the means for holding a vane to detachably connect to the means for holding a vane at the second end;
   at least one locator, the at least one locator being disposed on one of the means for holding a vane and the locator arm; and
   wherein the means for holding a vane and the locator arm being configured to position a vane against the at least one locator into a predetermined alignment position for a laser drilling operation in response to the second end of the locator arm being connected to the means for holding a vane.

15. The fixture of claim 14 wherein the means for holding a vane further comprises:
   at least one support plate, the at least one support plate being configured to position a vane against the at least one locator; and
   at least one first clamp, the at least one first clamp being configured to hold a vane for a laser drilling operation.

16. The fixture of claim 15 wherein the at least one support plate comprises at least one floating support, the at least one floating support being in contact with a vane held by the at least one first clamp to position a vane against the at least one locator.

17. The fixture of claim 16 wherein:
   the at least one support plate comprises two support plates being disposed substantially parallel to one another;
   the at least one floating support comprises two floating supports on each of the two support plates;
   the at least one first clamp comprising four first clamps, the four first clamps being disposed between the two support plates; and
   the means for holding a vane further comprises a spacer disposed between the two support plates and in contact with the two support plates.

18. The fixture of claim 16 wherein the means for holding a vane further comprises:
   at least one pair of clamping members;
   means for opening and closing the at least one pair of clamping members;
   the at least one support plate being disposed between the at least one pair of clamping members;
   at least one clamping member of the at least one pair of clamping members being disposed in contact with the at least one floating support; and
   the at least one floating support being prevented from positioning a vane held by the at least one first clamp in response to the at least one pair of clamping members being closed by the means for opening and closing the at least one pair of clamping members.

19. The fixture of claim 15 wherein the locator arm comprises means for positioning a vane held by the at least one first clamp against the at least one locator.

20. The fixture of claim 14 wherein the at least one locator comprises at least one locator disposed on the locator arm and at least one locator disposed on the means for holding a vane.

21. The fixture of claim 20 wherein the at least one locator disposed on the locator arm is configured to align a leading edge of a vane held in the means for holding a vane.

22. The fixture of claim 21 wherein:
   the locator arm further comprises a hinge device, the hinge device being configured to receive a leading edge of a vane;
   the at least one locator disposed on the locator arm being disposed on the hinge device to contact a leading edge of a vane held by the means for holding a vane in response to the second end of the locator arm being connected to the means for holding a vane; and
   whereby the second end of the locator arm can be disconnected from the means for locating a vane upon a vane being held in the predetermined alignment position in the means for holding a vane.

* * * * *